(12) United States Patent
Khoury et al.

(10) Patent No.: US 11,526,737 B2
(45) Date of Patent: Dec. 13, 2022

(54) PROCESSING MATRIX OPERATIONS FOR RATE LIMITED SYSTEMS

(71) Applicant: Lightelligence, Inc., Boston, MA (US)

(72) Inventors: Matthew Raja Khoury, Cambridge, MA (US); Rumen Rumenov Dangovski, Cambridge, MA (US); Longwu Ou, Cambridge, MA (US); Yichen Shen, Cambridge, MA (US); Li Jing, Cambridge, MA (US)

(73) Assignee: Lightelligence, Inc., Boston, MA (US)

( * ) Notice: Subject to any disclaimer, the term of this patent is extended or adjusted under 35 U.S.C. 154(b) by 330 days.

(21) Appl. No.: 16/778,495

(22) Filed: Jan. 31, 2020

(65) Prior Publication Data

US 2020/0250518 A1    Aug. 6, 2020

Related U.S. Application Data

(60) Provisional application No. 62/799,849, filed on Feb. 1, 2019.

(51) Int. Cl.
   *G06N 3/063*    (2006.01)
   *G06F 17/16*    (2006.01)
   *G06N 20/10*    (2019.01)
   *G06N 3/08*    (2006.01)

(52) U.S. Cl.
   CPC .............. *G06N 3/063* (2013.01); *G06F 17/16* (2013.01); *G06N 3/08* (2013.01); *G06N 20/10* (2019.01)

(58) Field of Classification Search
   CPC .......... G06N 3/063; G06N 20/10; G06N 3/08; G06F 17/16
   See application file for complete search history.

(56) References Cited

U.S. PATENT DOCUMENTS

| | | | | |
|---|---|---|---|---|
| 4,787,057 A | * | 11/1988 | Hammond | G06F 17/16 708/607 |
| 5,784,309 A | | 7/1998 | Budil | |
| 10,073,817 B1 | * | 9/2018 | Patil | G06F 17/16 |
| 10,229,237 B2 | * | 3/2019 | Fung | E21B 43/00 |
| 10,528,321 B2 | * | 1/2020 | Bittner | G06F 7/483 |
| 10,567,494 B2 | * | 2/2020 | Huang | G06F 9/505 |

(Continued)

OTHER PUBLICATIONS

Yang et al., "On-chip CMOS-compatible optical signal processor", Optics Express Jun. 4, 2012, vol. 20, No. 12, pp. 13560-13565.

(Continued)

*Primary Examiner* — Elias Desta
(74) *Attorney, Agent, or Firm* — Young Basile Hanlon & MacFarlane, P.C.

(57) ABSTRACT

Data to be processed includes vector element values of an input vector and matrix element values of a model matrix associated with a neural network model. A vector-matrix multiplication module receives a set of matrix element values for performing a vector-matrix multiplication operation. Processing the data includes computing a plurality of intermediate vectors based on element-wise vector multiplication between different subsets of the vector element values and different respective pre-processing vectors. The vector-matrix multiplication module is loaded with a core matrix, and the input vector is multiplied by the model matrix based on separately multiplying each of the intermediate vectors by the loaded core matrix.

17 Claims, 2 Drawing Sheets

(56) References Cited

U.S. PATENT DOCUMENTS

| | | |
|---|---|---|
| 2004/0243657 A1 | 12/2004 | Goren et al. |
| 2005/0193050 A1 | 9/2005 | Sazegari |
| 2014/0365548 A1 | 12/2014 | Mortensen |
| 2016/0239706 A1 | 8/2016 | Dijkman et al. |
| 2017/0351293 A1 | 12/2017 | Carolan et al. |
| 2018/0336164 A1 | 11/2018 | Phelps et al. |

OTHER PUBLICATIONS

Younger et al., "Design of an Optical Fixed-Weight Learning Neural Network", Proceedings of International Joint Conference on Neural Networks, Montreal, Canada, Jul. 31-Aug. 4, 2006, pp. 610-615.

Younger et al., "Computing by Means of Physics-Based Optical Neural Networks", EPTCS 26, 2010, pp. 159-167, doi:10.4204/EPTCS.26.15.

Ding et al., "CirCNN: Accelerating and Compressing Deep Neural Networks Using Block-Circulant Weight Matrices", MICRO-50, Oct. 14-18, 2017, Cambridge, MA.

Hughes et al., "Training of photonic neural networks through in situ backpropagation", arXiv:1805.09943v1 [physics.optics] May 25, 2018.

Zhang et al., "ShuffleNet: An Extremely Efficient Convolutional Neural Network for Mobile Devices", arXiv:1707.01083v2 [cs.CV] Dec. 7, 2017.

Chen et al., "Compressing Neural Networks with the Hashing Trick", arXiv:1504.04788v1 [cs.LG] Apr. 19, 2015.

Sze et al., "Efficient Processing of Deep Neural Networks: A Tutorial and Survey", arXiv:1703.09039v2 [cs.CV] Aug. 13, 2017.

Jouppi et al., "In-Datacenter Performance Analysis of a Tensor Processing Unit", 44th International Symposium on Computer Architecture (ISCA), Toronto, Canada, Jun. 26, 2017.

Abbaszadeh et al., "AnScalable Matrix Computing Unit Architecture for FPGA, and SCUMO User Design Interface", MDPI, Journals, Electronics, vol. 8, Issue 1, Jan. 15, 2019.

\* cited by examiner

PROCESSING MATRIX OPERATIONS FOR RATE LIMITED SYSTEMS

CROSS-REFERENCE TO RELATED APPLICATION(S)

This application claims priority to and the benefit of U.S. Provisional Application Patent Ser. No. 62/799,849, filed Feb. 1, 2019, the entire disclosure of which is hereby incorporated by reference.

TECHNICAL FIELD

This disclosure relates to processing matrix operations for rate limited systems.

BACKGROUND

Various techniques for machine learning involve computationally intensive steps for performing vector-matrix multiplication in which a vector is multiplied by a matrix. For example, for a neural network model, the size of a matrix used in the neural network based computation may be larger than the size of a matrix that can be loaded into a module of a computational system configured to perform the vector-matrix multiplication portion of the computation. So, part of performing the computation may involve dividing the matrix and the vector into smaller segments that can be provided to the module separately. Some systems have a limit on the rate at which different elements of the matrix can be loaded for different parts of the computation.

SUMMARY

In one aspect, in general, data to be processed includes vector element values of an input vector and matrix element values of a model matrix associated with a neural network model. A vector-matrix multiplication module receives a set of matrix element values for performing a vector-matrix multiplication operation. Processing the data includes computing a plurality of intermediate vectors based on element-wise vector multiplication between different subsets of the vector element values and different respective pre-processing vectors. The vector-matrix multiplication module is loaded with a core matrix, and the input vector is multiplied by the model matrix based on separately multiplying each of the intermediate vectors by the loaded core matrix.

In another aspect, in general, an apparatus for processing data that includes vector element values of an input vector and matrix element values of a model matrix associated with a neural network model comprises: a clock module configured to provide a clock signal associated with the data; a vector-matrix multiplication module configured to receive a set of matrix element values for performing a vector-matrix multiplication operation, wherein the vector-matrix multiplication module has a rate limit characterizing a maximum rate at which the set of matrix element values are able to be loaded between successive vector-matrix multiplication operations; and a computing subsystem configured to process data based on the clock signal, the processing including: computing a plurality of intermediate vectors based on element-wise vector multiplication between different subsets of the vector element values and different respective pre-processing vectors, where the number of cycles of the clock signal used to compute the plurality of intermediate vectors is less than a minimum number of cycles of the clock associated with the rate limit, loading the vector-matrix multiplication module with a core matrix, multiplying the input vector by the model matrix based on separately multiplying each of the intermediate vectors by the loaded core matrix.

Aspects can include one or more of the following features.

The loaded core matrix is multiplied by different intermediate vectors in different cycles of the clock signal.

The intermediate vectors are of length k, and the core matrix is of size k×k.

The value k is greater than 31 and smaller than 257.

The rate limit is less than 5 GHz.

The vector-matrix multiplication module comprises optical waveguides and optical amplitude modulators, and at least some of the vector element values are encoded on respective optical signals that are guided by the optical waveguides.

The core matrix is loaded into the vector-matrix multiplication module based on setting amplitude modulation levels of one or more of the optical amplitude modulators.

The rate limit is based on a rate at which the amplitude modulation levels are able to be set.

The vector-matrix multiplication module comprises a computing device that operates on electrical signals, and at least some of the vector element values are encoded on respective electrical signals that are received by the computing device.

The core matrix is loaded into the vector-matrix multiplication module based on retrieving the electrical signals from a memory device coupled to the computing device.

The rate limit is based on a rate at which the electrical signals are able to be retrieved from the memory device.

In another aspect, in general, a method for processing data that includes vector element values of an input vector and matrix element values of a model matrix associated with a neural network model comprises: providing a clock signal associated with the data; receiving, at a vector-matrix multiplication module, a set of matrix element values for performing a vector-matrix multiplication operation, wherein the vector-matrix multiplication module has a rate limit characterizing a maximum rate at which the set of matrix element values are able to be loaded between successive vector-matrix multiplication operations; and processing data, in a computing subsystem, based on the clock signal, the processing including: computing a plurality of intermediate vectors based on element-wise vector multiplication between different subsets of the vector element values and different respective pre-processing vectors, where the number of cycles of the clock signal used to compute the plurality of intermediate vectors is less than a minimum number of cycles of the clock associated with the rate limit, loading the vector-matrix multiplication module with a core matrix, multiplying the input vector by the model matrix based on separately multiplying each of the intermediate vectors by the loaded core matrix.

In another aspect, in general, a method for performing an inference computation using a model matrix associated with a neural network model comprises: receiving a core matrix that includes a set of matrix elements determined based on training of the neural network model; loading the core matrix into a vector-matrix multiplication module; computing a plurality of intermediate vectors based on element-wise vector multiplication between different subsets of vector element values of an input vector and different respective pre-processing vectors determined based on training of the neural network model; and performing vector-matrix multiplication of the input vector by the model matrix based on separately multiplying each of the intermediate vectors by the loaded core matrix.

In some aspects, the model matrix is related to the core matrix and each of the pro-processing vectors such that: the model matrix is formed from two or more submatrices concatenated together, for each submatrix, there is a different corresponding diagonal matrix having diagonal entries equal to vector element values of different pre-processing vectors, and each submatrix is equal to the core matrix multiplied by the corresponding diagonal matrix.

In another aspect, in general, an apparatus for performing an inference computation using a model matrix associated with a neural network model comprises: a vector-matrix multiplication module configured to receive a core matrix that includes a set of matrix elements determined based on training of the neural network model; circuitry configured to load the core matrix into a vector-matrix multiplication module; and circuitry configured to compute a plurality of intermediate vectors based on element-wise vector multiplication between different subsets of vector element values of an input vector and different respective pre-processing vectors determined based on training of the neural network model; wherein the vector-matrix multiplication module is configured to perform vector-matrix multiplication of the input vector by the model matrix based on separately multiplying each of the intermediate vectors by the loaded core matrix.

In another aspect, in general, an apparatus for processing data that includes vector element values of an input vector and matrix element values of a model matrix associated with a neural network model comprises: a vector-matrix multiplication module configured to receive a set of matrix element values for performing a vector-matrix multiplication operation, wherein the vector-matrix multiplication module is configured to perform optical amplitude modulation on values encoded on optical signals based on the set of matrix element values; and a computing subsystem configured to process data encoded on electrical signals, the processing including: computing a plurality of intermediate vectors based on element-wise vector multiplication between different subsets of the vector element values and different respective pre-processing vectors, where the vector element values and the pre-processing vectors are encoded electrical signals, loading the vector-matrix multiplication module with a core matrix, multiplying the input vector by the model matrix based on separately multiplying each of the intermediate vectors by the loaded core matrix.

In another aspect, in general, a method for processing data that includes vector element values of an input vector and matrix element values of a model matrix associated with a neural network model comprises: receiving, at a vector-matrix multiplication module, a set of matrix element values for performing a vector-matrix multiplication operation, wherein the vector-matrix multiplication module is configured to perform optical amplitude modulation on values encoded on optical signals based on the set of matrix element values; and processing, in a computing subsystem, data encoded on electrical signals, the processing including: computing a plurality of intermediate vectors based on element-wise vector multiplication between different subsets of the vector element values and different respective pre-processing vectors, where the vector element values and the pre-processing vectors are encoded electrical signals, loading the vector-matrix multiplication module with a core matrix, multiplying the input vector by the model matrix based on separately multiplying each of the intermediate vectors by the loaded core matrix.

Aspects can have one or more of the following advantages.

The techniques described herein are able to provide vector-matrix multiplication for use in various machine learning processes including processes using deep neural networks for natural language processing (NLP) applications (e.g., neural machine translation (NMT), or dialog systems), image classification, or object detection, for example. By reducing the number of times a different submatrix needs to be loaded into a vector-matrix multiplication module, significant speedup in processing used for inference can be achieved, without significantly sacrificing accuracy. In some implementations, the speedup is based on avoiding slowdown associated with accessing data from memory (also called "the memory wall"). In some implementations, the speedup is based on avoiding slowdown associated with loading values for optical modulation. While the number of times a submatrix needs to be loaded may be reduced, these techniques do also allow for the underlying matrix formed from the submatrices to dynamically change in the process of performing inference (e.g., as opposed to techniques where matrix weights may be fixed for longer periods of time during inference).

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Some machine learning systems, such as systems for NLP applications, improve performance accuracy by increasing the size of a neural network model (or simply "model"). However, a larger model generally calls for a larger number of hardware computations, which can slow down the system significantly due to increased latency during operation (e.g., at inference time). A vector-vector-matrix architecture (VVMA) described herein is able to reduce the latency during operation for a variety of systems that use the VVMA. The VVMA is able to take advantage of both efficient model design that compresses a neural network reducing demand for hardware computation, and acceleration of computations that are performed by the hardware due to the hardware design. For example, some systems that use the VVMA take advantage of a hardware design that supports relatively low-latency vector-vector operations (e.g., element-wise vector multiplication) compared to higher-latency vector-matrix operations. The techniques described herein are able to reduce the number of parameters and floating point operations per second (FLOPs) for some models that rely on efficient matrix multiplication, without significantly impacting accuracy.

The inherently sequential nature of many NLP tasks can increase latency at inference time. Constrained by their memory bandwidth and footprint, some systems rely on large batch sizes to avoid under-utilization. However, it is not always possible to increase the batch size if conclusions have to be inferred quickly, e.g., when doing inference in real time. For example, a system that uses a vector-matrix architecture (VMA) with hardware configured to perform vector-matrix multiplication, or a system that uses a matrix-matrix architecture (MMA) with hardware configured to perform matrix-matrix multiplication, may exhibit long latencies during inference for a given small-batch task (e.g., when translating a single sentence). A system that uses hardware configured for the VVMA can reduce latencies during inference even for small-batch tasks.

Efficient model configurations can decrease the complexity of neural networks. For example, techniques to shuffle data between neural network layers, or to compress a model matrix, can reduce the amount of computation needed while retaining similar performance and accuracy. The VVMA can also reduce computational complexity without significant decrease in performance or accuracy. However, unlike some techniques to make a model more efficient, the VVMA is able to focus on low levels of execution, such as the underlying matrix multiplication. Thus, the VVMA is generally applicable to a wide variety of neural network inference tasks that make use of matrix multiplication.

Figure 1:
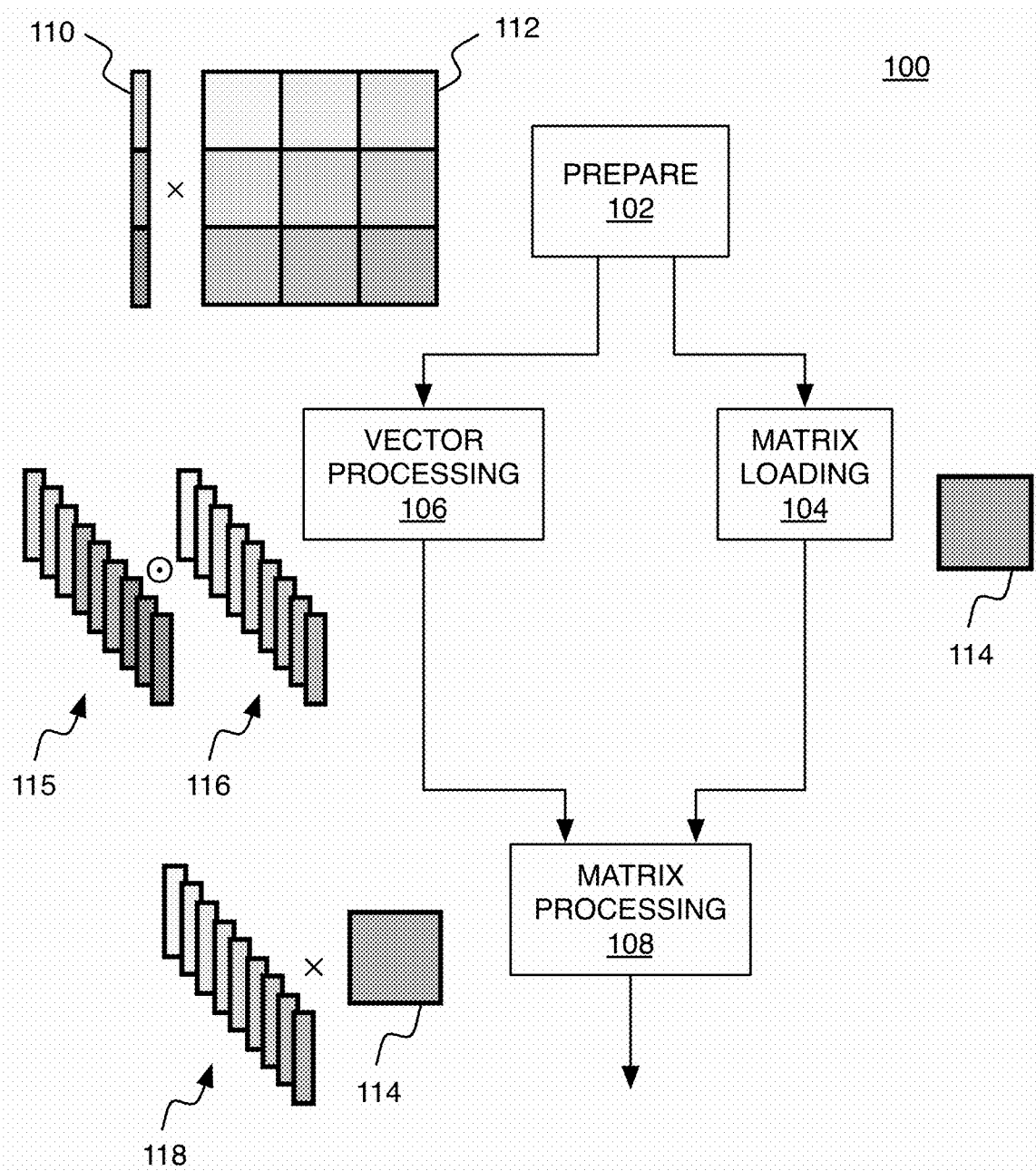
FIG. 1 is flowchart and schematic diagrams illustrating an example of vector-vector-matrix processing architecture.

The VVMA can provide significant acceleration in a system that has hardware configured to perform relatively low-latency vector-vector operations (e.g., element-wise vector multiplication). Referring to FIG. 1, an example of a vector-vector-matrix processing procedure 100 that can be used, for example, for neural network based computing systems. The procedure takes two vectors and a matrix, and it multiplies element-wise the first vector by the second vector and then multiplies the resulting vector by the matrix. In a prepare step 102, the procedure 100 determines data associated with a model matrix 112 to be used for processing an input vector 110. For example, some of the data may include information that has been determined based on previously performed training procedures. The input vector 110 may include vector element values that represent data used during inference using a neural network model.

In some implementations, a matrix loading step 104 and a vector processing step 106 may be performed concurrently, where some operations may be performed in parallel. The matrix loading step 104 may load a core matrix 114 into a vector-matrix multiplication module as a set of matrix element values to be used for a vector-matrix multiplication operation. Since this matrix loading step 104 may take a significant amount of time (e.g., due to a rate limit associated with the vector-matrix multiplication module), the vector processing step 106 is able to utilize that loading time for useful operations that are part of the computation. For example, different subsets 115 of vector element values of the input vector 110 can be multiplied by different respective pre-processing vectors 116 using element-wise vector multiplication (where corresponding elements of each vector are multiplied together to form an element of a resulting vector). Each of the resulting intermediate vectors 118 can then be multiplied by the same core matrix 114 in a matrix processing step 108 that is performed after the matrix loading step 104 has been completed. The rate limit for different implementations may vary depending on time needed to perform actions such as fetching data from memory (e.g., leading to a rate limit of around 100 kHz, 1 MHz, 10 MHz, 100 MHz, 1 GHz, or 5 GHz).

Figure 2:
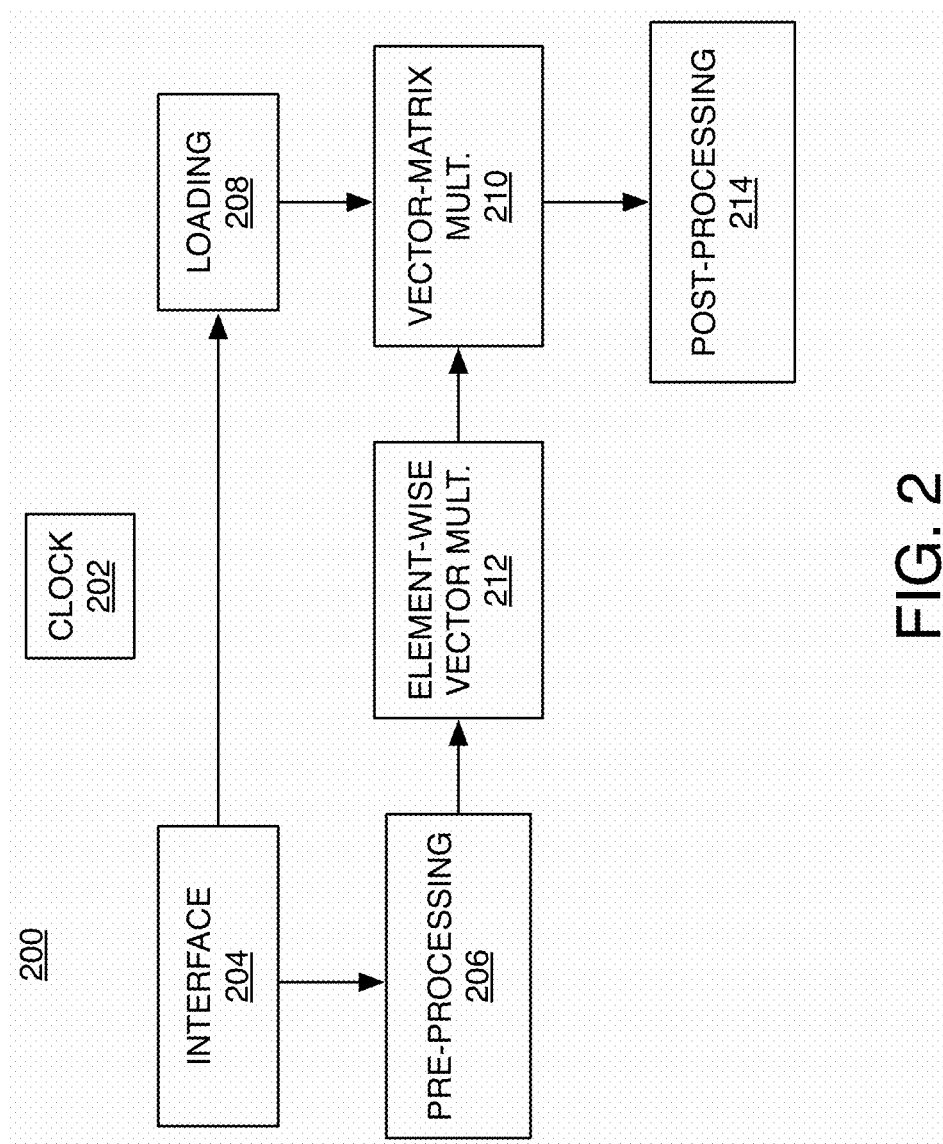
FIG. 2 is a schematic diagram of an example computing system.

Referring to FIG. 2, an example computing system 200 for performing the procedure 100 is shown. A clock module 202 may be used to distribute a clock signal to various modules that will perform operations synchronously, for example, using digital and/or analog electrical signals, and in some implementations, using optical signals for certain modules that can perform certain operations optically (e.g., optical amplitude modulation may be used for vector-matrix multiplication). An interface module 204 can be used to provide data that was determined in the prepare step 102. The interface module 204 may be coupled to a memory device, for example, that stores data that may be based on a neural network model. A pre-processing module 206 may perform various pre-processing computations, including training, or preparation of data determined from previous training.

Various steps of the procedure 100 can be performed using modules of the system 200. A loading module 208 can be configured to perform the matrix loading step 104. An element-wise vector multiplication module 212 can be configured to perform the element-wise vector multiplication that is part of the vector processing step 106. The vector-matrix multiplication operation of the matrix processing step 108 can be performed by a vector-matrix multiplication module 210. In some implementations, the operation is performed electronically on electrical signals (e.g., in a digital operation, or an analog operation using an array of modulators that attenuate or absorb power from the electrical signals). In other implementations, the operation is performed optically on optical signals (e.g., using techniques such as described in U.S. Patent Publication 2007/0351293, entitled "Apparatus and Methods for Optical Neural Network," incorporated herein by reference).

The element-wise vector multiplication module 212 and the loading module 212 can be configured to operate concurrently. While a loading operation occurs, multiple element-wise vector multiplication operations can occur between different subsets 115 of vector element values of the input vector 110 and different respective pre-processing vectors 116. For example, each of these operations between a particular subset of vector element values and a particular pre-processing vector can be performed in a short amount of time in some implementations (e.g., one clock cycle), such that all of the operations are complete before the loading is finished. Then after the loading is finished, a common core matrix can be multiplied by all the intermediate vectors that were computed.

The following example of steps that can be performed on a computing system such as the computing system 200 using procedures such as the vector-vector-matrix processing procedure 100 are described in the context of a systolic loop that includes matrix multiplications using a model matrix having different weight. In some implementations, weights can be reused for multiple batches of data while also using the systolic loop to perform matrix multiplication extremely fast. In this example, W is an n×n model matrix of $n^2$ weights, and x is an n-dimensional input vector. In order to perform a vector-matrix multiplication Wx on a computing system that supports vector-matrix multiplication for matrices of size k×k (where k<n), the matrix W can first be broken up into multiple submatrices of size k×k, and the vector x can be broken up into multiple subvectors of size k, as follows.

$$Wx = \begin{bmatrix} W_{1,1} & W_{1,2} & \cdots \\ W_{2,1} & W_{2,2} & \cdots \\ \vdots & \vdots & \ddots \end{bmatrix} \begin{bmatrix} x_1 \\ x_2 \\ \vdots \end{bmatrix}$$

Here, $W_{i,j}$ is a k×k submatrix of W, and $x_j$ is a k-dimensional subvector of x. The computing system loads each submatrix $W_{i,j}$ into its matrix multiplication hardware before multiplying it by the subvector $x_j$. Loading a k×k submatrix may take O(k) clock cycles in some computing systems. After loading the submatrix $W_{i,j}$ into the matrix multiplication hardware, it may take O(2k+t) clock cycles to multiply t k-dimensional subvectors by the submatrix $W_{i,j}$ using the VMA (instead of the VVMA). So, the total number of clock cycles needed to multiply t n-dimensional vectors by the model matrix W is as follows in computing systems using the VMA.

$$O\left(\frac{n^2}{k^2}(k+2k+t)\right)$$

Note that this procedure has a relatively large latency (measured by the order of magnitude of the number of clock cycles) for single-batch inference (i.e., for t=1).

In order to decrease the latency, the model matrix W can be adjusted so that so that a computing system using the VVMA only needs to load a single k×k core matrix M into the matrix multiplication hardware, such as the vector-matrix multiplication module 210. The computing system then performs element-wise vector multiplication operations for each subvector $x_j$ in order to make up for the extra parameters that are lost by re-using the same k×k core matrix M. With this VVMA adjustment, the total number of clock cycles needed to multiply t n-dimensional vectors by the model matrix W is as follows in computing systems using the VVMA.

$$O\left(k+2k+\frac{n^2 t}{k^2}\right)$$

Note that this adjusted procedure, such as the vector-vector-matrix processing procedure 100, has a lower latency for single-batch inference (i.e., for t=1). In some implementations, k may be selected to be a power of 2, and certain values of k may have a magnitude (e.g., 32, 64, 128, or 256) that is both small enough and large enough to balance various trade-offs in any of a variety of different system configurations.

In some implementations, the element-wise vector multiplication operation performed before the vector-matrix multiplication by the core matrix M does not take any additional clock cycles. This can be achieved by pipelining the element-wise vector multiplication operations as input vector data is being fed into the matrix multiplication hardware. Additionally, the element-wise vector multiplication operations can be initialized while loading weights of the core matrix M into the matrix multiplication hardware.

An example of a procedure for adjusting the model matrix W and computing an associated core matrix M. An initial step is to tile copies of the core matrix M into a larger matrix so that its size is greater than or equal to the size of the model matrix W. Each copy of the core matrix M is multiplied by a corresponding diagonal matrix $D_{i,j}$ such that the model matrix W can be replaced with an altered matrix that has the following structure:

$$\begin{bmatrix} MD_{1,1} & MD_{1,2} & \dots \\ MD_{2,1} & MD_{2,2} & \dots \\ \vdots & \vdots & \ddots \end{bmatrix}$$

where the core matrix M is a shared k×k weight matrix and $D_{i,j}$ is a diagonal k×k weight matrix. The diagonal matrices $D_{i,j}$ are introduced in order to provide variation for each section of the altered model matrix, enabling the altered model matrix to replace the original model matrix W, without causing significant reduction in accuracy. While the model matrix W and the core matrix M are both square matrices in these examples, in other examples either or both of these matrices may not be square, having a different number of rows and columns.

Each of the elements of the core matrix M is used in computing each of the submatrices of the altered model matrix, thus constraining the total number of free parameters compared to the original model matrix W. Each of the elements of the core matrix M and each of the elements of each diagonal matrix $D_{i,j}$ are learned as part of a training process of the machine learning algorithm. Even though each diagonal matrix $D_{i,j}$ is mathematically represented above as a matrix, they can alternatively be represented as a k-dimensional vector $v_{i,j}$. The vector-matrix multiplication $D_{i,j}x_j$ that is part of the inference computation can then alternatively be performed as an element-wise vector multiplication $v_{i,j} \odot x_j$, with the vector resulting from that element-wise vector multiplication being multiplied by the core matrix M using vector-matrix multiplication.

In some implementations, in order to efficiently implement altered model matrix as a trainable matrix, instead of constructing the entire matrix representation, the computing system can take advantage of broadcasting, which allows the system to perform element-wise multiplication on tensors of different shapes. Likewise, broadcasting can be used to multiply the input vector x by a larger diagonal tensor D. The system then performs a matrix multiplication with the broadcasted vector and the core matrix M. Thus, the system is able to construct a single k×k core matrix M once rather than constructing the core matrix multiple times during a tiling of a larger matrix.

A variety of other techniques can also be used when performing different types of machine learning algorithms in combination with some of the implementations described herein. For example, it may be useful to perform more aggressive gradient clipping in order to train seq2seq models that use VVMAs. If the value used to clip the gradient is too large, then the gradient may grow extremely large and eventually overflow. Such overflow may happen because the gradients accumulate when propagating back to a single small core matrix M. Some techniques enable speeding the training or use of neural networks, such as quantization and pruning techniques.

Some systems may include hardware that can be configured or modified to use the VVMA to optimize inference for neural networks (e.g., to decrease latency when performing inference). For example, some systems that use a vector-matrix multiplication module can be modified by adding an element-wise vector multiplication module that feeds the vector-matrix multiplication module. The element-wise vector multiplication module can be operated in a pipelined manner and initialized concurrently with loading of the vector-matrix multiplication module. Some systems that use a matrix-matrix multiplication module can also be modified by adding an element-wise vector multiplication module that feeds the matrix-matrix multiplication module.

As described above, some systems can be configured to use optical amplitude modulation to perform element-wise vector multiplication and/or vector-matrix multiplication. The potentially large delay associated with loading matrix weights from a memory into an optical modulator can be mitigated using an optical or electrical element-wise vector multiplication module before an optical vector-matrix multiplication module, which can be operated in a pipelined manner and initialized concurrently with loading of the optical vector-matrix multiplication module. An electrical element-wise vector multiplication module will not significantly increase the overall latency of a system that uses an optical vector-matrix multiplication module because the overall latency may be dominated by memory related operations such as fetching data for input vectors from digital electronic memory.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for processing data that includes vector element values of an input vector and matrix element values of a model matrix associated with a neural network model, the apparatus comprising:
   a clock module configured to provide a clock signal associated with the data;
   a vector-matrix multiplication module configured to receive a set of matrix element values for performing a vector-matrix multiplication operation, wherein the vector-matrix multiplication module has a rate limit characterizing a maximum rate at which the set of matrix element values are able to be loaded between successive vector-matrix multiplication operations; and
   a computing subsystem configured to process data based on the clock signal, the processing including:
      computing a plurality of intermediate vectors based on element-wise vector multiplication between different subsets of the vector element values and different respective pre-processing vectors, where the number of cycles of the clock signal used to compute the plurality of intermediate vectors is less than a minimum number of cycles of the clock associated with the rate limit,
      loading the vector-matrix multiplication module with a core matrix,
      multiplying the input vector by the model matrix based on separately multiplying each of the intermediate vectors by the loaded core matrix.

2. The apparatus of claim 1, wherein the loaded core matrix is multiplied by different intermediate vectors in different cycles of the clock signal.

3. The apparatus of claim 1, wherein the intermediate vectors are of length k, and the core matrix is of size k×k.

4. The apparatus of claim 3, wherein k is greater than 31 and smaller than 257.

5. The apparatus of claim 1, wherein the rate limit is less than 5 GHz.

6. The apparatus of claim 1, wherein the vector-matrix multiplication module comprises optical waveguides and optical amplitude modulators, and at least some of the vector element values are encoded on respective optical signals that are guided by the optical waveguides.

7. The apparatus of claim 4, wherein the core matrix is loaded into the vector-matrix multiplication module based on setting amplitude modulation levels of one or more of the optical amplitude modulators.

8. The apparatus of claim 7, wherein the rate limit is based on a rate at which the amplitude modulation levels are able to be set.

9. The apparatus of claim 1, wherein the vector-matrix multiplication module comprises a computing device that operates on electrical signals, and at least some of the vector element values are encoded on respective electrical signals that are received by the computing device.

10. The apparatus of claim 9, wherein the core matrix is loaded into the vector-matrix multiplication module based on retrieving the electrical signals from a memory device coupled to the computing device.

11. The apparatus of claim 10, wherein the rate limit is based on a rate at which the electrical signals are able to be retrieved from the memory device.

12. A method for processing data that includes vector element values of an input vector and matrix element values of a model matrix associated with a neural network model, the method comprising:
   providing a clock signal associated with the data;
   receiving, at a vector-matrix multiplication module, a set of matrix element values for performing a vector-matrix multiplication operation, wherein the vector-matrix multiplication module has a rate limit characterizing a maximum rate at which the set of matrix element values are able to be loaded between successive vector-matrix multiplication operations; and
   processing data, in a computing subsystem, based on the clock signal, the processing including:
      computing a plurality of intermediate vectors based on element-wise vector multiplication between different subsets of the vector element values and different respective pre-processing vectors, where the number of cycles of the clock signal used to compute the plurality of intermediate vectors is less than a minimum number of cycles of the clock associated with the rate limit,
      loading the vector-matrix multiplication module with a core matrix,
      multiplying the input vector by the model matrix based on separately multiplying each of the intermediate vectors by the loaded core matrix.

13. A method for performing an inference computation using a model matrix associated with a neural network model, the method comprising:
   receiving a core matrix that includes a set of matrix elements determined based on training of the neural network model;
   loading the core matrix into a vector-matrix multiplication module;
   computing a plurality of intermediate vectors based on element-wise vector multiplication between different subsets of vector element values of an input vector and different respective pre-processing vectors determined based on training of the neural network model; and
   performing vector-matrix multiplication of the input vector by the model matrix based on separately multiplying each of the intermediate vectors by the loaded core matrix.

14. The method of claim 12, wherein the model matrix is related to the core matrix and each of the pro-processing vectors such that:
the model matrix is formed from two or more submatrices concatenated together,
for each submatrix, there is a different corresponding diagonal matrix having diagonal entries equal to vector element values of different pre-processing vectors, and
each submatrix is equal to the core matrix multiplied by the corresponding diagonal matrix.

15. An apparatus for performing an inference computation using a model matrix associated with a neural network model, the apparatus comprising:
a vector-matrix multiplication module configured to receive a core matrix that includes a set of matrix elements determined based on training of the neural network model;
circuitry configured to load the core matrix into a vector-matrix multiplication module; and
circuitry configured to compute a plurality of intermediate vectors based on element-wise vector multiplication between different subsets of vector element values of an input vector and different respective pre-processing vectors determined based on training of the neural network model;
wherein the vector-matrix multiplication module is configured to perform vector-matrix multiplication of the input vector by the model matrix based on separately multiplying each of the intermediate vectors by the loaded core matrix.

16. An apparatus for processing data that includes vector element values of an input vector and matrix element values of a model matrix associated with a neural network model, the apparatus comprising:
a vector-matrix multiplication module configured to receive a set of matrix element values for performing a vector-matrix multiplication operation, wherein the vector-matrix multiplication module is configured to perform optical amplitude modulation on values encoded on optical signals based on the set of matrix element values; and
a computing subsystem configured to process data encoded on electrical signals, the processing including:
computing a plurality of intermediate vectors based on element-wise vector multiplication between different subsets of the vector element values and different respective pre-processing vectors, where the vector element values and the pre-processing vectors are encoded electrical signals,
loading the vector-matrix multiplication module with a core matrix,
multiplying the input vector by the model matrix based on separately multiplying each of the intermediate vectors by the loaded core matrix.

17. A method for processing data that includes vector element values of an input vector and matrix element values of a model matrix associated with a neural network model, the method comprising:
receiving, at a vector-matrix multiplication module, a set of matrix element values for performing a vector-matrix multiplication operation, wherein the vector-matrix multiplication module is configured to perform optical amplitude modulation on values encoded on optical signals based on the set of matrix element values; and
processing, in a computing subsystem, data encoded on electrical signals, the processing including:
computing a plurality of intermediate vectors based on element-wise vector multiplication between different subsets of the vector element values and different respective pre-processing vectors, where the vector element values and the pre-processing vectors are encoded electrical signals,
loading the vector-matrix multiplication module with a core matrix,
multiplying the input vector by the model matrix based on separately multiplying each of the intermediate vectors by the loaded core matrix.

* * * * *